(12) United States Patent
Guggemos (10) Patent No.: US 6,325,423 B1
(45) Date of Patent: Dec. 4, 2001

(54) ARRANGEMENT WITH A FEMALE PIPE ADAPTER, A FEMALE PIPE ADAPTER, A BOTTOM PAN, AN OPENING DESIGN, AND A MOLD CORE

(76) Inventor: Horst Guggemos, Sonnleitenweg 33, A-8043 Graz (AT)

( * ) Notice: Subject to any disclaimer, the term of this patent is extended or adjusted under 35 U.S.C. 154(b) by 0 days.

(21) Appl. No.: 09/636,159

(22) Filed: Aug. 10, 2000

(30) Foreign Application Priority Data

Aug. 18, 1999 (AT) ...................................... 1423/99

(51) Int. Cl.$^7$ ................................. F16L 7/00; F16L 21/00
(52) U.S. Cl. ........................... 285/189; 285/39; 285/45; 52/232
(58) Field of Search ........................ 285/45, 39, 189, 285/345, 337, 260; 52/232; 277/2.7 A (56) References Cited

U.S. PATENT DOCUMENTS

| | | | | |
|---|---|---|---|---|
| 3,345,089 | * | 10/1967 | Stepanich | 285/189 |
| 4,200,299 | * | 4/1980 | Carlesimo | 285/189 |
| 4,215,868 | * | 8/1980 | Skinner et al. | 285/260 |
| 4,478,437 | * | 10/1984 | Skinner | 285/189 |
| 4,646,486 | * | 3/1987 | Hauff | 52/232 |
| 5,060,986 | * | 10/1991 | Carter | 285/337 |
| 5,150,927 | * | 9/1992 | Skinner | 285/189 |
| 5,261,761 | * | 11/1993 | Knappert et al. | 285/345 |
| 5,451,081 | * | 9/1995 | Kaucnik | 285/189 |
| 5,553,973 | * | 9/1996 | Duran | 285/189 |
| 5,711,536 | * | 1/1998 | Meyers | 277/207 A |
| 6,123,365 | * | 9/2000 | Lamping | 285/45 |

* cited by examiner

Primary Examiner—Eric K. Nicholson
(74) Attorney, Agent, or Firm—Darby & Darby

(57) ABSTRACT

The invention relates to an arrangement with a female pipe adapter and/or a female pipe adapter (1) with a first pipe section (5) and a second pipe section (6) that is connected to same and has a larger interior diameter, into which a connector pipe (4) can be inserted, whereby the connector pipe (4) is sealed with a seal (18) whose one end (18') can be inserted into the second pipe section (6) and is tightly connected via a chucking means (24) to the inside surface (6') of the second pipe section (6), and whose other end (18") tightly adjoins the outside surface (19) of the connector pipe (4) or is tightly connected to same with a clamping means (25). According to the invention, it is provided that in the transitional region between the first pipe section (5) and the second pipe section (6), an adapter pipe section (7) is formed in which a recess (30) is cut out through which the actuator unit (24') of the chucking means (24) for the end (18') of seal (18) inserted in the second pipe section (6) is accessible and adjustable from the first pipe section (5).

35 Claims, 6 Drawing Sheets

ARRANGEMENT WITH A FEMALE PIPE ADAPTER, A FEMALE PIPE ADAPTER, A BOTTOM PAN, AN OPENING DESIGN, AND A MOLD CORE

BACKGROUND OF THE INVENTION

1. Field of the Invention

The present invention relates to a pipe adapter, especially an arrangement with a female pipe adapter or a female pipe adapter, in particular for bottom pans, sewer or water mains, raceways or similar components. The arrangement or the adapter has a cylindrical pipe section which ends in a main pipe or raceway or may be integrally formed in one piece with same, to carry the medium, and with a second pipe section of larger inside diameter than the first pipe section that is connected to and formed preferably in one piece with the first pipe section, into which the connector pipe to be installed into female pipe adapter can be inserted. Fir sealing the connector pipe, a seal , such as a lip seal, is provided whose one end is insertable into the second pipe section and may ne tightly connected by a fastening or chuck to the inside surface of the second pipe section, and whose other end tightly is adjoinable to the outside surface of connector pipe or is or can be tightly connected to this outside surface by a fastening or clamping means. A bottom pan is also disclosed.

The application also concerns designing a wall opening of a bottom pan, sewer or water main, raceway or similar component, using a seal for tightly connecting a connector pipe to the opening formed in one side of the wall. One end of seal is insertable into the wall opening and may be tightly connected to inside wall surface with fastening or chucking means, and whereby the other end tightly adjoins to the outside surface or an connector pipe.

Furthermore, the application concerns a bottom pan having a U-shaped or V-shaped cross section for raceway carrying a liquid medium. Here, the bottom pan is connectable to at least one connector pipe carrying the medium. The bottom pan in this structure has an opening that is formed to accommodate an connector pipe. A seal is provided for tightly connecting the connector pipe to the opening formed in one side of the wall. One end of the seal is insertable into the opening with a cylindrical inside wall surface and is connectable to the inside wall surface of the opening with a fastening or chucking means, while the other end is or can be tightly adjoined to the outside surface with a fastening or clamping means.

Lastly, the application concerns a mold core for producing an arrangement or a female pipe adapter.

2. Description of the Related Art

It is known in prior art to integrate or mold female pipe adapters into a main-pipe wall, whereby a lip seal is used to connect the connector pipe tightly to the female pipe adapter. For this purpose, such lip seals are provided with a fastening or chucking means lying inside the lip seal at the end where the lip seal is to be connected to the female pipe adapter, which fastening or chucking means is used to apply pressure to the inside surface of the lip seal, providing a seal by pressing its outside surface to the inside surface of the female pipe adapter. The inside surface of the other end of the lip seal, away from the pipe adapter, is pressed tightly against the outside surface of the connector pipe with another fastening or clamping means that applies pressure to the outside surface of the lip seal. In this manner, a medium-tight connection between connector pipe and female pipe adapter is provided, and due to the elasticity of the lip seal, which is preferably formed of rubber, the connector pipe can be adjusted or fixed in certain angular positions in relation to the female pipe adapter.

The operation of the fastening or chucking means for the end of the lip seal lying in the female pipe adapter presents difficulties. Difficulties arise in particular when the diameter of the female pipe adapter is larger in the end region into which the lip seal is inserted than the diameter of the other end region which may, for example, end in a main pipe.

SUMMARY OF THE INVENTION

An objective of the invention is to create an arrangement with a female pipe adapter or a female pipe adapter in which problems in terms of the accessibility of the fastening or clamping means are solved; however, at the same time, this female pipe adapter is to have a special design and to be provided with a facility or receptacle for the forward end region of the connector pipe to be inserted into the female pipe adapter.

This objective is achieved through an arrangement with a female pipe adapter or a female pipe adapter of the type mentioned above, according to the invention, in that a transitional pipe section is formed in the transitional region between a first pipe section and a second pipe section, into which preferably the end region of connector pipe can be inserted and in which a recess is provided through which an actuator unit of a fastening or chucking means for the end of a seal inserted into the second pipe section is accessible and adjustable from the first pipe section.

For accommodating the forward end region of the connector pipe, an adapter pipe section is formed in the female pipe adapter offering a facility of receptacle for the forward end region of the connector pipe, but without interfering with the positioning or position changes afforded by the elastic lip seal. Because this adapter pipe section between the first pipe section and the second pipe section is extending from the first to the second pipe section with the larger diameter, it would interfere with access to the actuator unit of the fastening or chucking means, since this actuator unit is situated in the circumferential region of the second pipe section. To avoid having to adjust this actuator unit through the first pipe section , which is also particularly difficult because the fastening or chucking means can come quite close to the first pipe section or the adapter pipe section, which have a smaller diameter than the second pipe section, a recess is formed in the adapter pipe section through which the actuator unit is made directly accessible for a tool such as a socket wrench, etc. This recess can be formed without impairing the sealing effect provided by the lip seal between the female pipe adapter and the connector pipe or without impairing the stability of the female pipe adapter. It is particularly advantageous that the necessary subsequent adjustments or regulation of the actuator unit is always possible with easy access to the integrated female pipe adapter.

Advantageously, the invention provides for a stable design and a defined facility or receptacle for the forward end region of the connector pipe and which also allow for sufficient swivelling or a change in position suitable for all kinds of applications.

Because a structurally advantageous and stable design is achieved, it is easier to construct the female pipe adapter in one piece.

To prevent the recess from filling up, for example when being installed in a main pipe while concrete for a main pipe wall is being poured. This surrounds and protects the recess in a housing-like fashion. To improve accessibility and the possibility of penetration through the recess thus enclosed in housing-like fashion.

To integrate the female pipe adapter into a main-pipe wall or into the wall of a bottom pan preferably molded in one piece. If the first pipe section, the outside wall section and the side wall sections end in the inside wall of the main pipe or in one piece in an inner lining of the main pipe or in a raceway, sealing between a pipe adapter according to the invention and the main pipe or the raceway or a bottom pan becomes easy. This also prevents the accumulation of contaminants.

Further, the invention pertains to an advantageous arrangement or female pipe adapter with a compensation element which is meant to take into account the different wall thicknesses and/or inside and/or outside diameters of the connector pipes. To prevent that such compensation elements can interfere with access to the actuator unit, an appropriately large recess or appropriately wide gap is provided in the circumferential region of this compensation element.

The recess or gap in the compensation element and the recess in the female pipe adapter are aligned with each other to provide the best possible access to the actuator unit.

Another objective of the invention is to provide a bottom pan of the kind named above, with good accessibility to the fastening or chucking means.

According to the invention, a bottom pan of the type named above, provided with a female pipe adapter, is formed. The actuator unit can be easily and simply adjusted and subsequently regulated in spite of the different diameters of the first and second pipe sections.

It is also known from the prior art to connect connector pipes with lip seals tightly to the openings of walls, raceways, water and sewer mains or similar elements or to install them in these. This involves inserting one end of the lip seal into the wall opening with appropriate fastening or chucking means and causing the chucking means to press it against the wall of the wall opening. The other end of the lip seal is arranged around the connector pipe and pressed tightly against the outside wall of the connector pipe with a fastening or clamping means.

Another objective of the invention is to provide an opening design in a wall or wall opening of the above named type. in which the actuator unit of the fastening or chucking means of the inserted lip seal is easily accessible, even when the diameter of the opening is reduced on the side of the wall facing away from the connector pipe. This objective is accomplished with a wall opening.

In this connection, it is noted that the inside wall of the wall opening and the inside wall of the female pipe adapter are basically of the same design and that therefore all the characteristics described for the inside wall design of the female pipe adapter also apply to the inside wall design of the wall opening. The design of the housing-like covering for the recess can be substantially the same for the wall opening as for the female pipe adapter, and it is also possible to provide a compensation element as for the wall opening. The lip seal also allows for sufficient swivelling or a change in position of the connector pipe. Thanks to the recess or gap formed in the wall, the actuator unit can be operated and also adjusted and subsequently regulated.

The advantages that can be achieved with the equivalent characteristics realized with the female pipe adapter.

According to the invention, a bottom pan is provided. In such a bottom pan, the connector pipe is inserted directly into the wall opening formed according to the invention in the bottom pan, and not into a female pipe adapter. This wall opening possesses the same inside configuration or the same inside wall surface design as the female pipe adapter according to the invention. Thanks to the design of the recess provided according to the invention, this bottom pan according to the invention allows easy access for a tool to the actuator unit of the fastening or chucking means for the end of the lip seal to be fastened in the wall opening.

Finally, the invention also relates to a mold core. This mold core can be used to provide a female pipe adapter according to the invention and/or for providing a wall opening according to the invention, and it is formed in such a way that the two pipe sections of the female pipe adapter having different diameters or the two inside or cylinder wall surfaces of the wall opening having different inside diameters can be designed. Thus, the outside surface of the mold core corresponds to the inside wall configuration of the female pipe adapter and/or the wall opening. Thus, all characteristics realized for those surfaces of the female pipe adapter and the wall opening are also realized for the outside or circumferential surface of the mold core, and vice versa.

This mold core of innovative design can be inserted into a mold for producing a main-pipe wall or a main pipe, thus forming the appropriate wall opening in the main-pipe wall when concrete is poured into the forms for the main pipe. A corresponding mold core can also be used for manufacturing the female pipe adapters.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
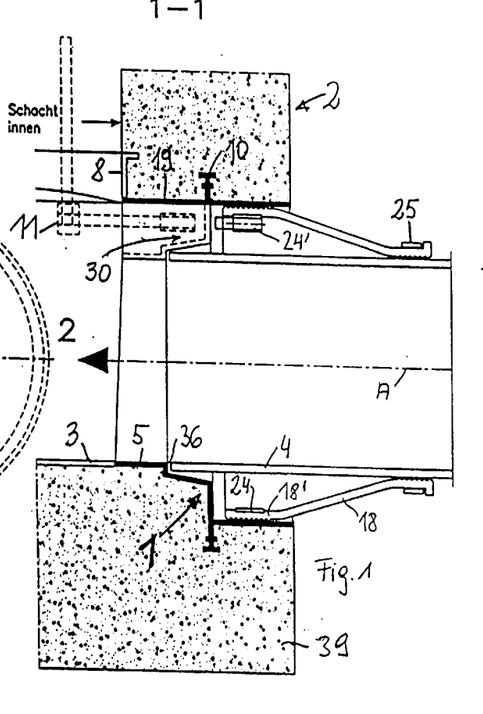
FIGS. 1 and 2 show sections through arrangements or female pipe adapters according to the invention, inserted into a bottom pan.
Figure 2:
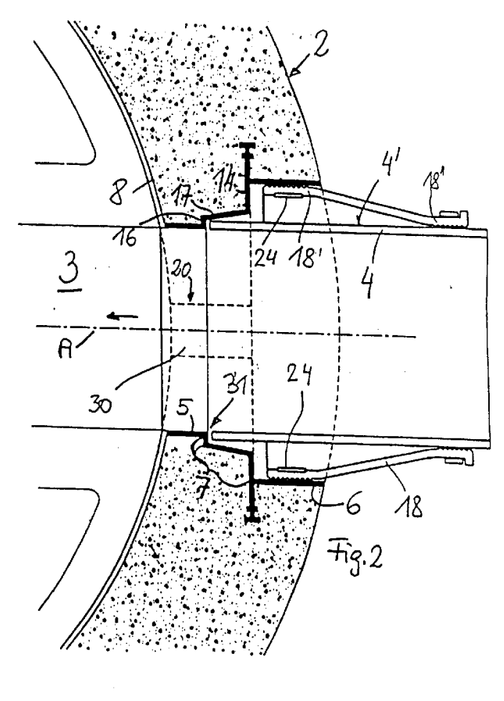

FIGS. 1 and 2 show a vertical/horizontal section of a female pipe adapter 1 integrated into a water or sewer main 2 or raceway 3 of a bottom pan. Female pipe adapter 1 is cast into the concrete of main pipe 2 and formed in one piece with a main-pipe lining 8 which is also surrounded by the concrete of main pipe 2 and which forms part of raceway 3. Female pipe adapter 1 is provided with a first pipe section 5 pointing toward the inside space of main pipe 2 and followed in one piece by a second pipe section 6 of larger diameter, via an adapter pipe section 7. The adapter pipe section 7 encloses a wall section 16 which is preferably formed in a plane running perpendicular to longitudinal axis A. This wall section 16 can be followed by a section 17 which either surrounds longitudinal axis A centrally in the form of a cylinder jacket, or widens—as shown—in the form of a straight circular-cone mantle toward the second pipe section 6. This section 17 is followed by another wall section 14 which is preferably formed in a plane running perpendicular to longitudinal axis A, which turns into the second pipe section 6. Female pipe adapter 1 can be anchored to the main-pipe wall with projections or extensions 10.

Wall sections 14 and 16 may also run at a slant in relation to longitudinal axis A.

A connector pipe 4 is inserted into the second pipe section 6 and made to adjoin surface 36 of wall section 16 which points toward the second pipe section 6. Due to the angle of incline of inside surface 17' of section 17, connector pipe 4 can be swivelled in all directions within a certain angular range by its end facing away from the female pipe adapter, but it remains within section 17.

Connector pipe 4 is tightly connected to the female pipe adapter 1 by means of a seal 18, in particular a lip seal made of rubber. The outside end region 18" of lip seal 18 is pressed tightly against the outside surface 4' of connector pipe 4 via a fastening or clamping means 25. The end region 18' of lip seal 18, which is inserted into the inside space of second pipe section 6, is pressed tightly against inside surface 6' of second pipe section 6 via a fastening or chucking means 24 arranged inside seal 18. The fastening means 24 and 25 can be of various designs and may have different types of actuator units. As a rule, the actuator units consist of rotatable adjustment elements or adjustment screws extending along longitudinal axis A which can be turned and regulated with specially adapted tools.

Figure 3:
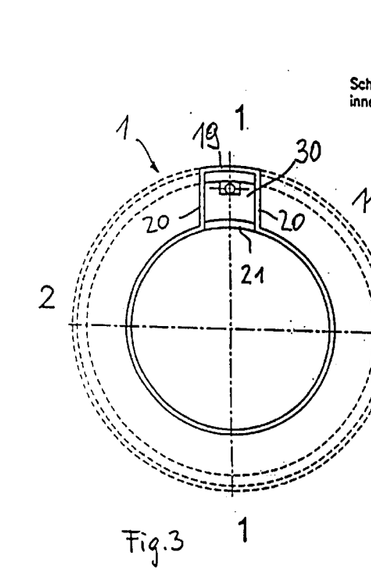
FIG. 3 shows a view of a female pipe adapter according to FIGS. 1 and 2 as seen from the first pipe section.

As FIG. 3 indicates, FIG. 1 shows a vertical section and FIG. 2 shows a horizontal section through a main pipe with a female pipe adapter. FIGS. 1 and 3 indicate that the actuator unit 24' of fastening or chucking means 24 is arranged in the upper or uppermost region of female pipe adapter 1. This is important, since in the lower region of female pipe adapter 1, a level transition 31 must be provided between the raceway 3 resting on bottom pan 39 and the first pipe section 5 and connector pipe 4. The bottom region of female pipe adapter 1 is therefore not accessible. Thus, preferably, the actuator unit 24' is arranged in the uppermost region or zenith of female pipe adapter 1.

Also formed in that region of female pipe adapter 1 is a recess 30 in transitional region 7, at least in wall section 14, which should lie opposite recess 30 and actuator unit 24'. If a female pipe adapter 1 is placed in a main-pipe wall 2 with a recess 30 not arranged in the zenith, actuator unit 24' must accordingly be installed at a different angle, with recess 30 aligned. Actuator unit 24' is accessible through this recess 30 with a tool 11 (shown only schematically) and can be used either to press end 18' of seal 18 to inside surface 6' of second pipe section 6, or to disconnect chucking means 24.

According to FIG. 3, which shows a frontal view of female pipe adapter 1 according to FIGS. 1 and 2, recess 30 is covered or limited circumferentially or toward the top by an outside wall section 19 extending the second pipe section 6. Recess 30 is laterally limited by side wall sections 20. Side wall sections 20 and outside wall section 19 are formed in one piece. The same applies to side wall sections 20 in relation to first pipe section 5, wall section 16, section 17 and wall section 14. In that manner, a tight housing or limitation is formed for recess 30, which is thus protected against concrete entering from above or from the side, which means that female pipe adapter 1 can be installed without interfering with recess 30.

Recess 30 may be provided only in wall section 14, so that the widening section 17 and wall section 16 can remain without such a recess and formed continuously. However, it is also possible to provide recess 30 in or extend it into section 17 and wall section 16 as well as in first pipe section 5, as is shown in the perspective view of female pipe adapter 1 according to FIG. 4.

Figures 1A, 4:
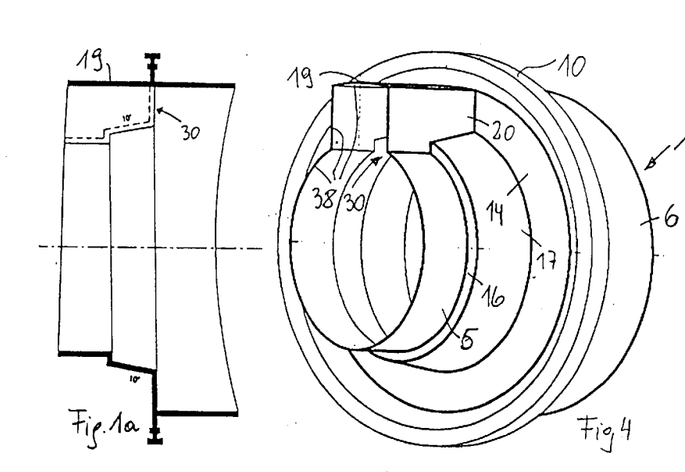
FIGS. 1a and 2a show sections through the adapters shown in FIGS. 1 and 2 in the same positions.
FIGS. 4 and 5 show perspective views of two adapters according to the invention.

In that case it is advantageous if the frontal surfaces 38 of outside wall section 19 and of side wall sections 20 and of first pipe section 5 lie or end in one plane. That plane could be either a plane perpendicular to longitudinal axis A or a cylindrical surface. In particular, it would be a cylindrical surface if female pipe adapter 1 is to be integrated into a cylindrical main pipe or into a raceway of cylindrical circumference, so that the frontal surfaces 38 are aligned flush in this cylindrical surface.

Figures 2A, 5:
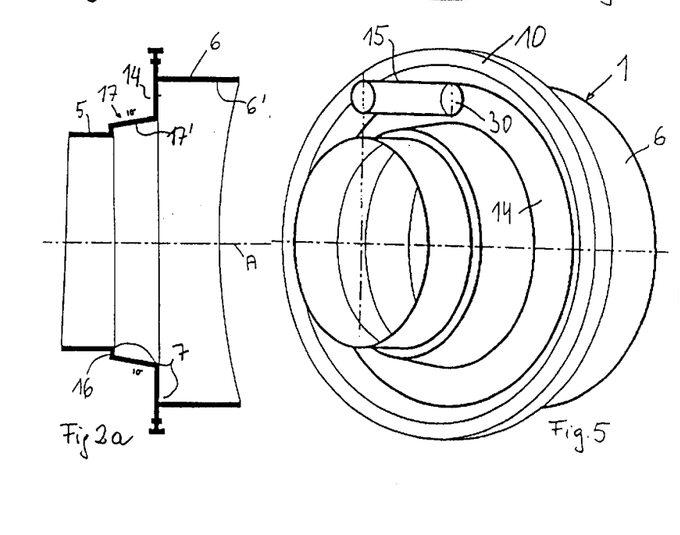

FIG. 5 shows an embodiment of a female pipe adapter 1 according to the invention, with recess 30 shown in wall section 14, and surrounded by a tube section 15 which in this case is of cylindrical design. This embodiment is advantageous for guiding a tool 11; the actuator unit 24' is aligned flush with the tube section 15.

Figures 6, 7:
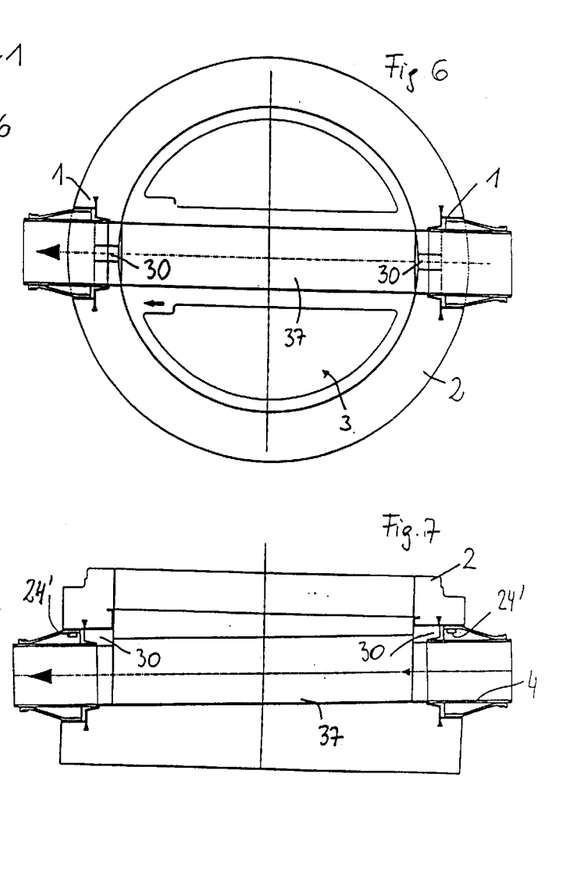
FIGS. 6 and 7 show female pipe adapters integrated into a bottom pan, in top view and in sectional view.

FIGS. 6 and 7 show a bottom pan in schematic top view and in schematic section, with a raceway 3, whereby female pipe adapters 1 are integrated opposite each other in main-pipe wall 2 and connected to each other by a channel. Recesses 30, through which the actuator units 24' of the fastening and chucking means 24 are accessible, can be seen in the zenith of each female pipe adapter 1.

Figure 10:
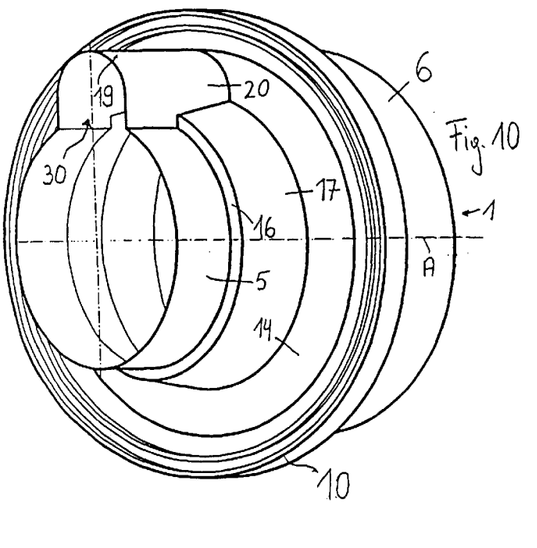
FIGS. 10, 11, 12 and 13 show embodiments of female pipe adapters, as seen from the first pipe section.
Figure 11:
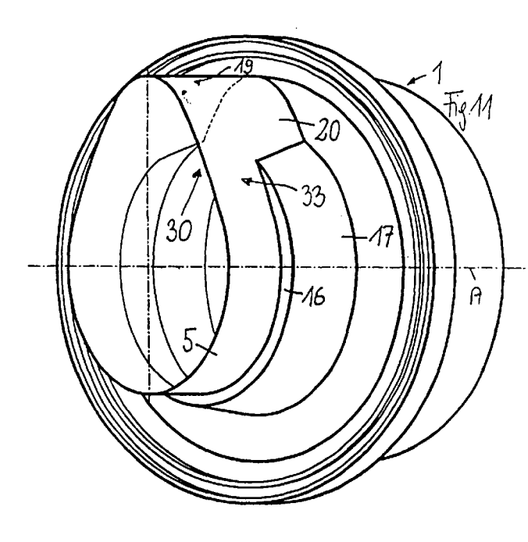

FIGS. 10 and 11 show embodiments of female pipe adapters 1 according to the invention, in perspective view. In the design according to FIG. 10, the side wall sections 20 and the outside wall section 19 continuously merge with each other while forming an appropriate curve or rounding.

In recess 30 according to FIG. 11, the curved outside wall section 19 turns into side wall sections 20; at point 33, the side wall sections 20 branch off tangentially from first pipe section 5.

In these two embodiments, as in the embodiment according to FIG. 4, first pipe section 5, wall section 16 and section 17 are recessed in the direction of longitudinal axis A, and wall section 14 is recessed in radial direction, so that the inside space of female pipe adapter 1 is limited in this region by the first wall section 14 and by side wall sections 20 and outside wall section 19, or so that recess 30 and the inside space merge into each other.

Advantageously, first pipe section 5 and second pipe section 6 are centered on longitudinal axis A; wall section 16, the widening section 17 and section 14 can also be designed as symmetrical circles and aligned centrally to longitudinal axis A.

Figure 8:
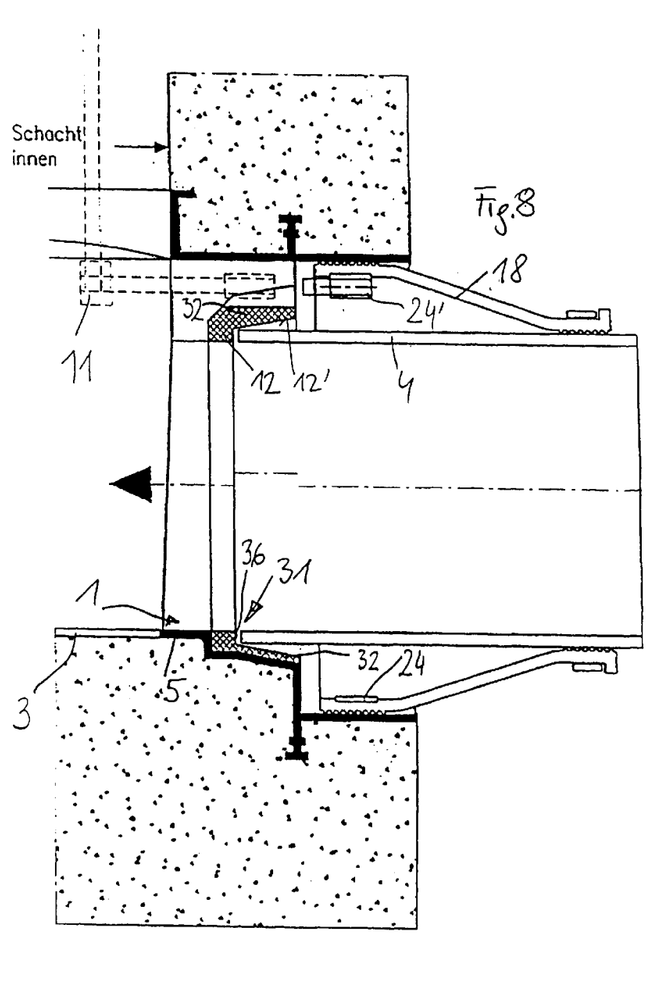
FIG. 8 shows a female pipe adapter with a compensation element.
Figure 9:
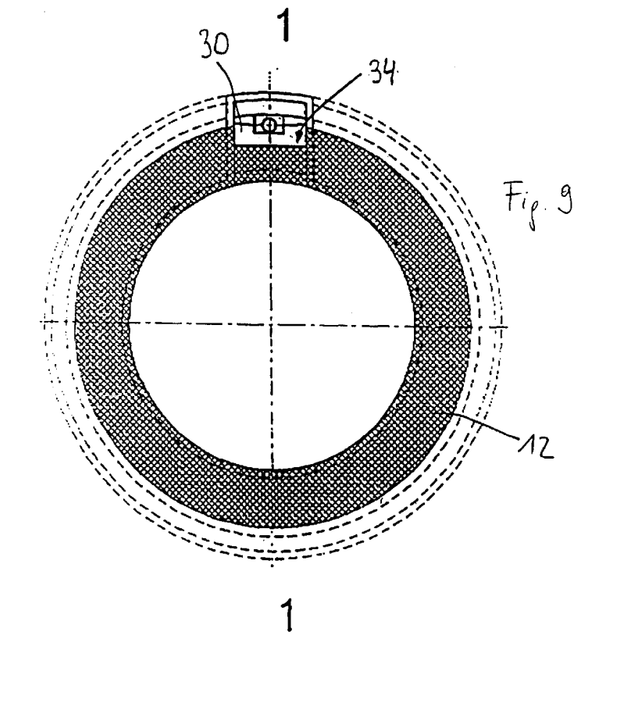
FIG. 9 shows a schematic frontal view of the female pipe adapter shown in FIG. 8.

The female pipe adapter 1 according to FIG. 8 and 9 serve for the optional connection of connector pipes 4 of a given nominal width, but with a wall thickness and/or inside and/or outside diameter that can vary in spite of the given nominal width, and for the simultaneous formation of a continuous, even-leveled transition 31 in the flow region near the bottom pan between first pipe section 5 and connector pipe 4. In the preferably widening section 17 or in th transitional pipe section 7, a ring-shaped compensation element 12, adapted to or taking into consideration the wall thickness and/or the inside and/or outside diameter of a connector pipe 4 of given nominal width, is or can be inserted, in particular as an exchangeable element. Actuator unit 24' is accessible and adjustable through the recess 34 provided in the circumference of compensation element 12, or through a gap or radial gap.

In the embodiment of a female pipe adapter 1 according to the invention, as shown in FIG. 8, the compensation element 12 inserted into transitional pipe section 7 facilitates the attachment or accommodation of connector pipes 4 whose inside or outside diameter or whose wall thickness is subject to certain fluctuations in relation to the nominal diameter of female pipe adapter 1. Thus, an even-leveled transitional region 31 can be formed in the bottom region between connector pipe 4 and first pipe section 5, preventing the accumulation of residue in that region. However, compensation elements 12 should not interfere with access to the actuator unit 24' of the fastening and chucking means 24. For that reason, as FIG. 9 shows, a recess 34 is formed in the circumferential region of compensation element 12, and the dimensions of that recess correspond at least partly to those of recess 30.

Instead of providing a recess 34 in compensation element 12 from the circumference, it is also possible to design a compensation element 12 that is interrupted or provided with a gap, whereby the gap comes to lie in the region of recess 30 or is flush with same when compensation element 12 is inserted into transitional pipe section 7.

The inclination of inside surface 12' of projection or extension 32 of compensation element 12 is substantially the same as the inclination of the widening section 17. Advantageously, extension 32 of compensation element 12 reaches as far as wall section 14. It can also be provided that the widening section 17 does not have the shape of a regular circular cone but that of a slanted (circular) cone, to give room to compensation elements 12, which are provided with extensions 32 of various thickness along their circumference, extending in the direction of this second pipe section 6.

Advantageously, female pipe adapter 1 according to the invention is made of sewer-resistant plastic or metal, continuously in one piece.

Figure 12:
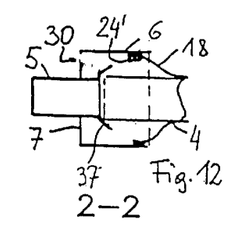

FIG. 12 shows an embodiment of the female pipe adapter 1 according to the invention, in which transitional pipe section 7 branches off first pipe section 5 and merges into the second pipe section 6. In this transitional pipe section 7, recess 30 is formed through which actuator unit 24' for chucking means 24 of seal 18 can be adjusted. The first pipe section 5 extends through or beyond transitional pipe section 7 toward second pipe section 6 and carries in its forward end region a wall section 37 which connector pipe 4 can be made to adjoin. Wall section 37 ends at a distance from second pipe section 6 that is large enough for a tool 11 to reach actuator unit 24' through recess 30. If that space is not large enough, a recess for tool 11 can also be formed in wall section 37. Advantageously, the female pipe adapter 1 according to FIG. 12 is constructed in two parts, namely by connecting first pipe section 5 to transitional pipe section 7 and second pipe section 6, for example by means of gluing, welding, etc. FIG. 12 does not show the parts which form the housing that surrounds recess 30.

Figure 13:
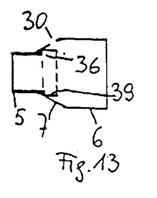

FIG. 13 shows another embodiment of a female pipe adapter 1, in which the transitional pipe section 7 runs at a slant. First pipe section 5 shows an adjoining surface 36 for connector pipe 4 and integrally molded wall sections 39 into which connector pipe 4 can be inserted. Recess 30 is formed in the slanted transitional pipe section 7. FIG. 13 also does not show the parts which form the housing that surrounds and protects recess 30.

Figures 14, 16:
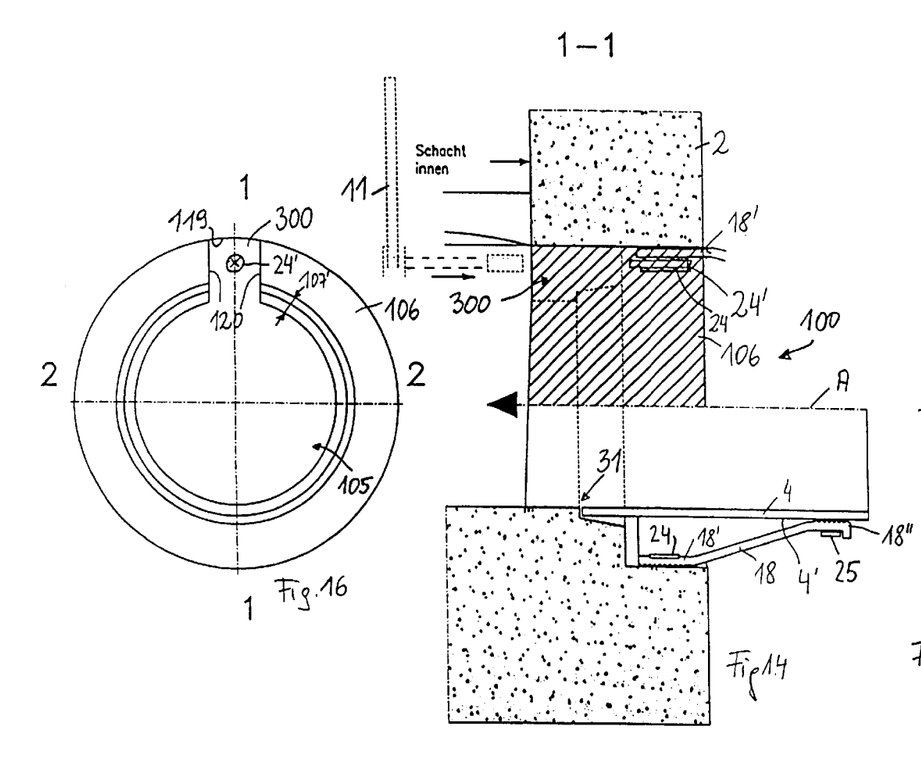
FIGS. 14 and 15 show lateral views of a wall opening formed in a (main pipe) wall.
FIG. 16 shows a frontal view of the wall opening.
Figure 15:
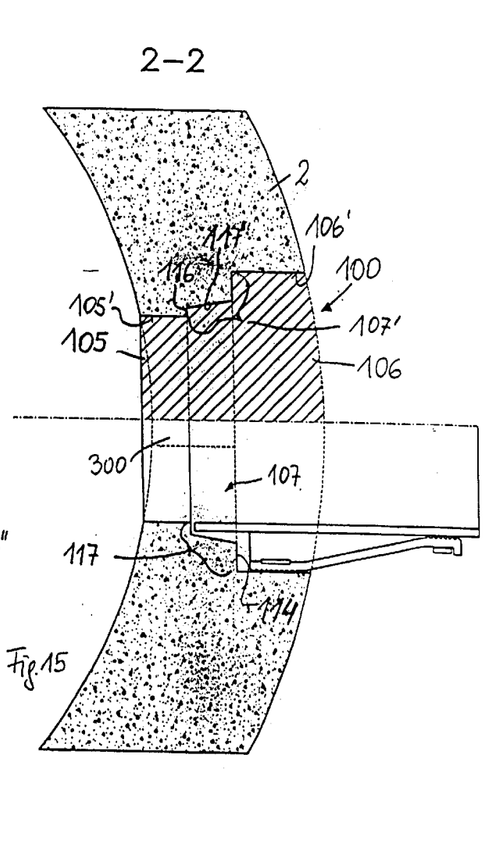

FIG. 14 shows a wall opening 100 provided in wall 2 of a bottom pan or sewer or water main or raceway. This wall opening has substantially the same internal structure as female pipe adapter 1 according to the invention. In wall 2, a first opening 106 with a cylindrical inside wall surface is formed which merges into a slanted inside wall section 117' via an inside wall surface 114 positioned in a plane perpendicular to longitudinal axis A. This slanted inside wall section 117' in turn merges—via a wall section 116 positioned in a plane perpendicular to longitudinal axis A—into a second, opposite opening 105 which has a cylindrical inside wall surface 105'. Thus, transitional region 117 between the first opening 106 and the other opening 105 if encloses a transitional wall surface 107' which surrounds inside wall surface 114, inside wall section 117' and wall section 116. Advantageously, inside wall section 117' is formed in the shape of a circular-cone mantle. Inside wall surface 114 and wall section 116 can also extend at a slant in relation to longitudinal axis A.

As can be seen particularly from FIG. 14, a recess 300 is provided in the upper region or zenith of wall opening 100, to create access for a tool 11 with which the actuator unit 24' for the fastening or chucking means for the end 18' of a seal 18 accommodated by opening 100 can be adjusted.

FIG. 16 provides a frontal view of wall opening 100 according to FIG. 14. It shows recess 300 limited by the side wall surfaces 120 and an outside wall surface 119; actuator unit 24' can be seen through recess 300.

In the same manner as with female pipe adapter 1 according to the invention, a compensation element 12 can be applied against transitional wall surface 107, in particular against wall section 116 or inside wall section 117'. In that regard, reference is made to the description in connection with female pipe adapter 1 according to the invention.

Figure 17:
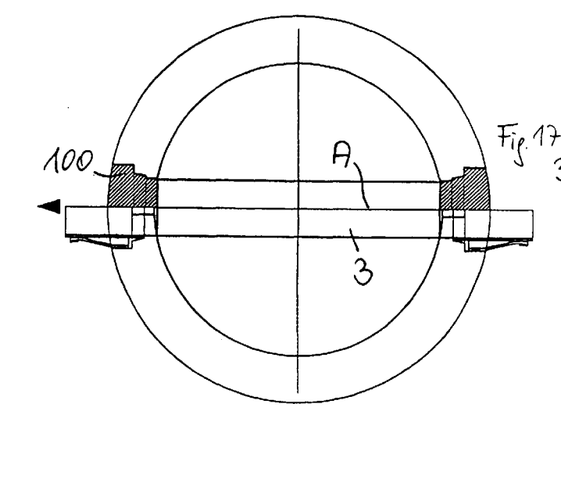
FIGS. 17 and 18 show a bottom pan with a wall opening according to the invention, in horizontal and vertical view.
Figure 18:
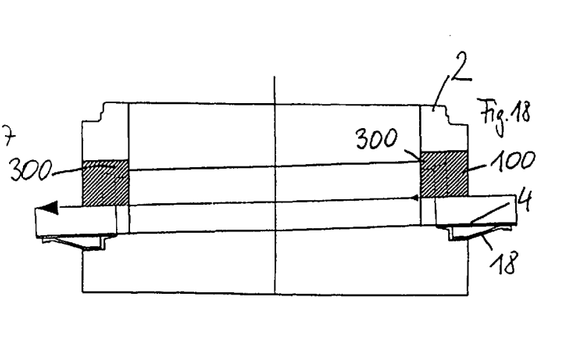
Figure 19:
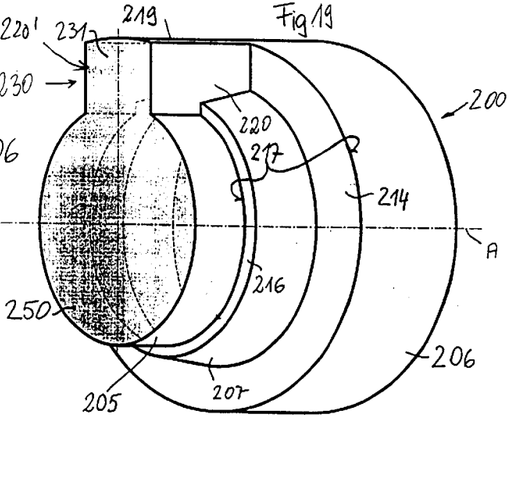
FIGS. 19 to 23 show mold cores according to the invention, in perspective view and in sectional view.
Figure 20:
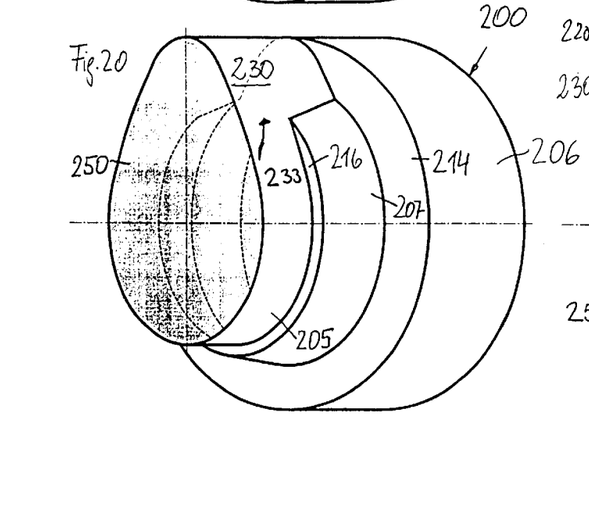

FIGS. 17 and 18, similarly to FIGS. 6 and 7, show a bottom pan in top view and in sectional view. Wall opening 100 is provided directly in main-pipe wall 2. This was done by inserting a mold core 200 into the appropriate form when the main-pipe wall was produced. This mold core 200 (which may consist of one or more parts) can be removed after the forms are taken off the finished main pipe or bottom pan, thus leaving opening 100.

FIGS. 19 to 23 show perspective views and sectional views, respectively, of such a form core 200. The circumferential surfaces and shapes of mold core 200 correspond to the inside a wall surfaces of female pipe adapter 1 according to the invention or wall opening 100 according to the invention. This mold core can be made of plastic, metal, wood or other materials.

Mold core 200 encompasses a transitional region 217 which surrounds a wall surface 216, a transitional section 207 and another wall surface 214. Wall surfaces 214, 216 run perpendicular or at a slant in relation to longitudinal axis A.

The construction or integrally molded portion 230 serves the purpose of forming recess 30 in a case when the mold core is used for producing a female pipe adapter 1 according to the invention, or for producing opening 300 if the mold core is used to provide a wall opening 100 according to the invention.

Figures 21, 22:
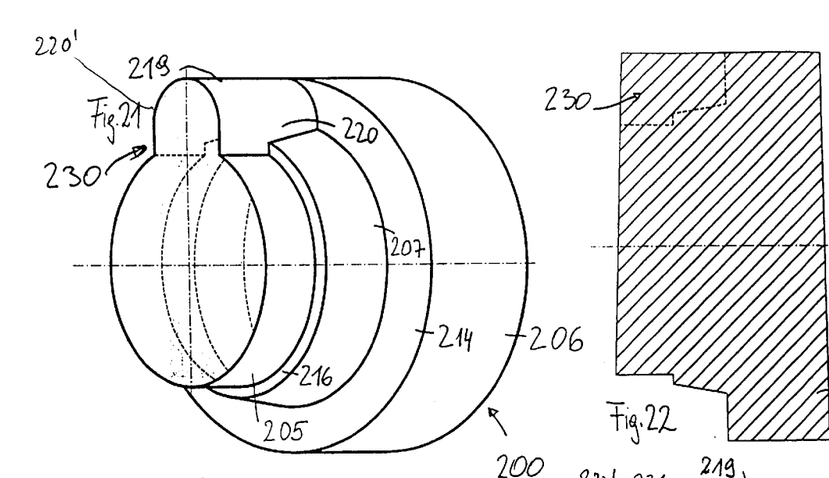
Figure 23:
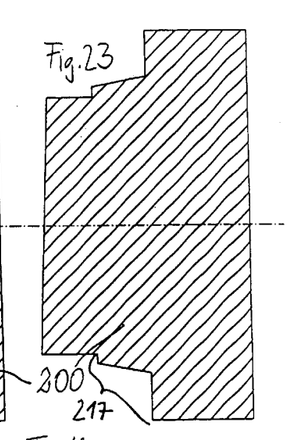

FIG. 22 shows a vertical section through a mold core according to FIGS. 19 to 21, and FIG. 23 shows a horizontal section. Here, a mold core 200 is shown for producing a female pipe adapter, including a first cylindrical section 206 which has larger diameter as the second cylindrical section 205. The transitional section 207 is arranged between the two cylindrical sections 205 and 206. A first wall section 216 is arranged between the second cylindrical section and the transitional section; the second wall section 214 is arranged between the first cylindrical section 206 and the transitional section 207, all along a common longitudinal axis (A). The transitional section 207 may be cone-shaped, having an angle of incline in relation to common axis (A) of about 5° to 20°, preferably 8° to 13°. The diameter of the second cylindrical section 205 is smaller than the diameter of the first cylinder section 206. The transitional section 207 is located between the first 206 and the second cylindrical section 205. An integral molded projection 230 is provided in the second cylindrical section 205 and the transitional section 207, the integral molded projection 230 includes an outside wall surface 219 and two side walls 220, 220' terminating into the first cylindrical section 206.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A female pipe adapter (1) for a water main, a bottom pan, a sewer (2) or a raceway (3), comprising
   a first cylindrical pipe section adjacent to the water mains (2) or raceway for carrying a medium;
   a second pipe section (6) having an inside surface (6'), the second pipe section (6) having a larger inside diameter than the first pipe section (5);
   a connector pipe (4) having an end region and an outside surface (19), the connector pipe being arranged at one end adjacent to the first pipe section (5) and at the other end to the inside surface (6), so as to seal the connector pipe (4);
   a seal (18) having a first end (18') and a second end (18"), the first end (18') being attached to the second pipe section (6), the seal is tightly connected to the inside surface (6') of the second pipe section (6), and the second end (18") is tightly connected to one of the outside surface (19) of the connector pipe (4) and an outside surface (19) by clamping means (25);
   a transitional pipe section (7) is formed between the first pipe section (5) and the second pipe section (6), the end region of connector pipe (4) is attached to the transitional pipe section (7);
   a recess (30) is disposed in the transitional pipe section, and the recess provides access through which from the first pipe section (5) an actuator unit (24') of a fastening means (24) is provided, so as to accommodate access for adjustability for the end (18') of the seal (18) which is inserted into the second pipe section (6).

2. The female pipe adapter according to claim 1, wherein the transitional pipe section (7), surrounding a wall section (16) adjoining the first pipe section (5) and positioned in a plane perpendicular to the longitudinal axis (A) of the first pipe section (5), is provided with a cylindrical widening pipe section (17) adjoining wall section (16), and a widening section (17) that is cone-shaped, and wherein the angle of incline of the inside wall surface (17') of the widening section (17) in relation to the longitudinal axis (A) of the first pipe section (5) is about 5° to 20°.

3. The female pipe adapter according to claim 1, wherein the transitional pipe section (7) surrounds a wall section (14) adjoining the pipe section (17) and extending in a plane perpendicular to the longitudinal axis (A) which merges into the second pipe section (6).

4. The female pipe adapter according to claim 3, wherein the recess (30) is at least partly surrounded by lateral wall sections (20), such that the region of the recess (30) lying radially outside in relation to the longitudinal axis (A) is surrounded by an outside wall section (19) which continues the outside surface of the second pipe section (6) in one piece.

5. The female pipe adapter according to claim 4, wherein the recess (30) is surrounded on both sides by side wall sections (20) which extend parallel to a sectional plane through the longitudinal axis (A) of the first pipe section (5), which side wall sections (20) are formed in one piece with outside wall section (19), wall section (14), section (17) and first pipe section (5).

6. The female pipe adapter according to claim 5, wherein the recess (30),wherein the side wall sections (20) in wall section (14) extends into wall section (14) and into section (17), into wall section (16) and into first pipe section (5).

7. The female pipe adapter according to claim 6, wherein the side wall section (20) and outside wall section (19), starting from first pipe section (5) and the transitional pipe section (7), extend continuously with rounded transitional regions (9).

8. The female pipe adapter according to claim 1, wherein the first pipe section (5) and a tube section (15), outside wall section (19) and side wall sections (20) end in a plane that is perpendicular to a longitudinal axis (A) or in a cylindrical surface.

9. The female pipe adapter according to claim 8, wherein the recess (30) and an actuator unit (24') of a fastening means (24) are positioned within the range of a radial distance from the longitudinal axis (A).

10. The female pipe adapter according to claim 9, wherein the inside diameter of the first pipe section (5) corresponds to an inside diameter of the connector pipe (4).

11. The female pipe adapter according to claim 10, wherein, for accommodation of the connection of connector pipes (4) of a given nominal width and for the simultaneous formation of a continuous transitional region (31) of equal level in the bottom flow region between the first pipe section (5) and the connector pipe (4), a ring-shaped and an exchangeable compensation element (12) is inserted in the widening section (17), adapted to the given nominal width and taking same into account, against which compensation element (12) the connector pipe (4) is applied, so that the compensation element (12) is provided along its circumference with an interruption such as a gap,or recess (34) through which the actuator unit (24') of the fastening or chucking means (24) for the end (18') of seal (18) inserted into the second pipe section (6) is accessible and adjustable.

12. The female pipe adapter according to claim 11, wherein the shapes of recess (30) and of recess (34) are at least partly adapted to each other or at least partly match each other.

13. The female pipe adapter according to claim 11, wherein the recess (34) is positioned in the circumferential region of the compensation element (12) and is open toward the outside.

14. The female pipe adapter according to claim 13, wherein the inside surface (12") of compensation element (12) is slanted at an angle of 5° to 20°.

15. The female pipe adapter according to claim 14, wherein the connector pipe (4) is adjoining the surface (36) of wall section (16) or compensation element (12) that is facing the second pipe section (6).

16. A bottom pan of a cross section for raceway (3) carrying a liquid medium, having channels to which the bottom pan is connected to at least one connector pipe (4) carrying the medium, whereby at least one female pipe adapter (1) is disposed in a mantle (2) of the raceway, the at least one female pipe adapter (1) is formed as one piece with the raceway (3) to carry the medium, having a first pipe section (5) followed by a second pipe section (6) of larger inside diameter than the first pipe section (5), to accommodate connector pipe (4), and a seal is provided for sealing a connector pipe (4), one end (18') of which seal is insertable into a second pipe section (6) and is connectable to the inside surface (6') of the second pipe section (6) with a fastening means (24), a second end (18") of the seal being connectable to an outside surface (4') of the connector pipe (4), wherein in the transitional region between the first pipe section (5) and the second pipe section (6), a transitional pipe section (7) is provided into which the end region of connector pipe (4) is inserted, and in which a recess (30) is provided through which an actuator unit (24') of the fastening means (24) for the end (18') of seal (18) inserted into second pipe section (6) is accessible and adjustable.

17. The bottom pan according to claim 16, wherein the recess (30) and the actuator unit (24') are arranged in the upper circumferential region of the at least one female pipe adapter (1).

18. The bottom pan according to claim 17, wherein the female pipe adapter (1) of the bottom pan is designed according to claim 2.

19. A sealable wall opening (100) in a wall (2) of a bottom pan, sewer or water main comprising a seal (18) for connecting a connector pipe (4) to first opening (106) formed in wall (2), so that one end (18') of the seal (18) is insertable into the first opening (106) which has a cylindrical inside wall surface (106'), and is connectable to the inside wall surface (106') with fastening means (24), and whereby the second end (18") of the seal is tightly adjoinable to the outside surface (4') with a fastening means (25), wherein a second opening (105) with a cylindrical inside wall surface (105') follows the first opening (106) in axial direction (A), the inside diameter of the second opening is smaller than the inside diameter of the first opening (106), and between the first opening (106) and the second opening (105) there is disposed a transitional region (117), having a transitional opening (107) with a transitional wall surface (107') for accommodating the end region of the connector pipe (4), and in the wall (2), a recess (300) is formed which penetrates the transitional wall surface (107') and ends in the first opening (106), through which recess actuator unit (24') of fastening or chucking means (24) for end (18') of seal (18) inserted in the first opening (106) is accessible and adjustable from the wall side in which the second opening (105) ends.

20. The sealable wall opening according to claim 19, wherein the transitional wall surface (107'), which surround a slanted wall section (116) which is positioned in a plane perpendicular to longitudinal axis (A) of the second opening (105) and which follows the second opening (105), is provided with a cylindrical shaped widening inside wall section (117'), whereby the angle of incline of inside wall section (117') in relation to longitudinal axis (A) of the second opening (105) is 5° to 20°.

21. The sealable wall opening according to claim 20, wherein the transitional wall surface (107') surrounds an inside wall surface (114) that follows inside wall section (117') and extends in a plane perpendicular to longitudinal axis (A) and limits first opening (106).

22. The sealable wall opening according to claim 21, further comprising a recess (300), which is limited on both sides by side wall surfaces (120) which extend parallel to a sectional plane through longitudinal axis (A) of the second opening (105) and by an outside wall surface (119) lying radially outside in relation to longitudinal axis (A), which may pass through an inside wall surface (114).

23. The sealable wall opening according to claim 22, wherein the recess (300), which is limited by two side wall surfaces (120) and an outside wall surface (119), starting from the second opening (105) and transitional surface (107') shows a continuous course with rounded transitional regions (109) or directly or tangentially arranged transitional regions (133).

24. The sealable wall opening according to claim 23, wherein the second opening (105) and outside wall surface (119) and the side wall surfaces (120) limiting recess (300) end in a plane that is positioned perpendicular to longitudinal axis (A) or in a cylindrical surface of wall (2).

25. The sealable wall opening according to claim 24, wherein, for the optional connection of connector pipes (4) of a given nominal width, with a wall thickness and an inside and outside diameter that varies in spite of the given nominal width, and for the simultaneous formation of a continuous, even-leveled transitional region (31) in the flow region near the bottom pan between the second opening (105) and connector pipe (4), in the widening transitional region (117) or in transitional wall surface (107'), a ring-shaped compensation element (12), adapted to or taking into consideration at least one of the wall thickness and the inside and outside diameter of connector pipe (4) of given nominal width, is inserted, whereby compensation element (12) is provided along its circumference with a recess or gap (34) through which actuator unit (24') of the fastening or chucking means (24) for end (18') of seal (18) inserted into first opening (106) is accessible and adjustable.

26. The wall opening according to claim 25, wherein the shape of recess (300) and the shape of recess (34), which is positioned in the circumferential region of compensation element (12) and is open toward the outside, are at least partly adapted to each other and at least partly match each other.

27. The wall opening according to claim 26, wherein the wall section (116) which faces the first opening (106) of the compensation element (12) is designed as an adjoining surface for connector pipe (4).

28. The bottom pan of a U-shaped or V-shaped cross section for a raceway (3) carrying a liquid medium, the bottom pan being connected to at least one connector pipe (4) carrying the medium, the bottom pan having a wall mantle (2) including at least one first opening (106) to accommodate a connector pipe (4) and a seal (18) for tightly connecting a connector pipe (4) to the at least one first opening (106) formed in the wall (2), and whereby one end (18') of the seal (18) is capable of being inserted into the opening (106) with acylindrical inside wall surface (106') and connectable to the inside wall surface (106') of the at least one first opening (106) with a fastening means (24), while the other end (18") being adjoined to an outside surface (4') of the at least one connector pipe (4), wherein the at least one first opening (106), which extends in axial direction (A), is followed by the second opening (105) with a cylindrical inside wall surface (105'), whose inside diameter is smaller than the inside diameter of the at least one first opening (106), and wherein, in the transitional region (117) between the at least one first opening (106) and the second opening (105), a transitional opening (107) is arranged with a transitional wall surface (107'), and that in the wall (2) a recess (300) is provided which is positioned outside or above inside wall surface (105') of the second opening (105), penetrating transitional wall surface (107') and ending in the first opening (106), through which recess an actuator unit (24') of the fastening or chucking means (24) for the end (18') of the seal (18) inserted into the at least first opening (106) is accessible and adjustable from the wall side into which the second opening (105) ends.

29. The bottom pan according to claim 28, wherein the recess (300) is arranged in the upper circumferential region.

30. The bottom pan according to claim 29, wherein the wall opening (100) of the bottom pan is designed with according to claim 19.

31. The female pipe adapter according to claim 13, wherein the angle is about 8° to 13°.

32. The bottom pan according to claim 16, wherein the bottom pan has a U-shaped cross section.

33. The bottom pan according to claim 16, wherein the bottom pan has a V-shaped cross section.

34. The bottom pan according to claim 28, wherein the seal (18), is a rubber lip seal.

35. The bottom pan according to claim 28, wherein the second opening has an zenith and wherein the recess (300) is arranged in the zenith.

* * * * *